United States Patent Office 3,023,216
Patented Feb. 27, 1962

3,023,216
PROCESS FOR THE INTRODUCTION OF CARBOXYL GROUPS INTO AROMATIC COMPOUNDS
Bruno Blaser, Dusseldorf-Urdenbach, Werner Stein, Dusseldorf-Holthausen, and Hubert Schirp, Dusseldorf, Germany, assignors to Henkel & Cie, G.m.b.H., Dusseldorf-Holthausen, Germany, a corporation of Germany
No Drawing. Filed Mar. 6, 1959, Ser. No. 797,600
Claims priority, application Germany Mar. 7, 1958
14 Claims. (Cl. 260—295.5)

This invention relates to a process of obtaining aromatic or aromatic heterocyclic dicarboxylic and tricarboxylic acids from mixtures of aromatic or aromatic heterocyclic compounds free of carboxylic groups and alkali metal salts of aromatic or aromatic heterocyclic carboxylic or polycarboxylic acids.

As was previously found, aromatic di- and polycarboxylic acids or their salts may be produced by heating salts of aromatic monocarboxylic acids in admixture with salts of aromatic polycarboxylic acids which contain more than two carboxyl groups in the molecule to a temperature above 300° C. and the transforming the salts thus obtained into the free acids, if desired. During this reaction a migration of carboxyl groups from one molecule to the other as well as in some cases a rearrangement of carboxyl groups within the molecule takes place, so that, for example, two mols potassium terephthalate are obtained from one mol potassium benzoate and one mol of the potassium salt of a benzene tricarboxylic acid.

It is an object of this invention to produce symmetrical aromatic or aromatic heterocyclic polycarboxylic acids, primarily dicarboxylic acids by interreactions of both carbocyclic and heterocyclic aromatic compounds free from carboxyl groups with alkali-metal salts of both carbocyclic and heterocyclic aromatic carboxylic or polycarboxylic acids.

It is a further object of this invention to produce mixtures of aromatic carbocyclic dicarboxylic acids and aromatic heterocyclic dicarboxylic acids by the interaction of aromatic heterocyclic compounds free from carboxyl groups with alkali-metal salts of aromatic carbocyclic carboxylic or polycarboxylic acids.

It is a still further object of this invention to produce terephthalic acid by the interaction of benzene and alkali-metal salts of benzene polycarboxylic acids having at least three carboxyl groups.

It is another object of this invention to produce mixtures of terephthalic and isocinchomeronic acids by the interaction of pyridine and alkali-metal salts of benzene monocarboxylic or polycarboxylic acids.

These and other objects of this invention will become apparent as the description thereof proceeds.

We have found that carboxyl groups can be directly introduced into aromatic carbocyclic or aromatic heterocyclic compounds free from carboxyl groups by reacting the same in the absence of substantial amounts of oxygen, such as in a non-oxidative atmosphere, and under anhydrous conditions with alkali-metal salts of aromatic carbocyclic or aromatic heterocyclic carboxylic acids at elevated temperatures under pressure and in the presence of suitable catalysts. During the reaction according to the present invention, the carboxyl groups of the carboxylic acid salts serving as the starting material are entirely or partially transferred to the nucleus of the aromatic compound free from carboxyl groups in a symmetrical arrangement. For example, in accordance with the process of the invention, potassium terephthalate is obtained from benzene and the potassium salt of pyromellitic acid in accordance with the following equation

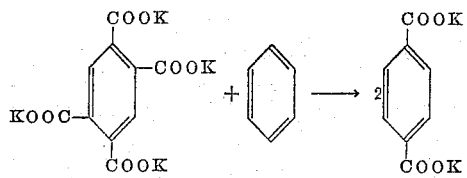

The corresponding free acids or their derivatives may then be obtained from the salts produced in the above manner in accordance with known methods.

Suitable compounds free from carboxyl groups which may be used as starting materials for the process according to the invention are aromatic carbocyclic compounds free from carboxyl groups; for example, monocyclic aromatic hydrocarbons such as benzene; dicyclic aromatic hydrocarbons such as naphthalene, diphenyl; and other polycyclic aromatic hydrocarbon compounds. Similarly, aromatic heterocyclic compounds free from carboxyl groups may be used as starting materials for the process of the invention. This includes those heterocyclic compounds which contain one or more hetero atoms in the ring and which are designated as having an aromatic character because of their chemical behavior.

Examples of such compounds are monocyclic and dicyclic aromatic nitrogen-heterocyclic compounds of the pyridine series, such as pyridine, quinoline, isoquinoline, $\alpha,\alpha$-dipyridyl and the like, and monocyclic and dicyclic aromatic sulfur-heterocyclic compounds of the thiophene series such as thiophene, thianaphthene and the like.

The above described starting materials may carry substituents such as hydrocarbon radicals or other substituents, for example, ether groups or halogen atoms, provided that under prevailing reaction conditions a destruction of the molecule does not occur by virtue of these substituents.

Aromatic carboxylic acids which are reacted in the form of their alkali-metal salts with the above-mentioned aromatic carbocyclic or aromatic heterocyclic compounds in accordance with the present invention are, for example, benzene carboxylic acids, especially the tricarboxylic acids, hemimellitic acid, trimellitic acid and trimesic acid; the tetracarboxylic acids, mellophanic acid, prehnitic acid, and pyromellitic acid; benzene-pentacarboxylic acid and mellitic acid. Mixtures of such polycarboxylic acids may also be used. Mono- or dicarboxylic acids of benzene may also be used for the carboxylation of heterocyclic compounds. Such a method of operation is often advantageous because benzoic acid and phthalic acids are industrially readily accessible substances. The above-mentioned benzene carboxylic acids are produced according to know processes, for example by oxidation of alkyl benzenes or by oxidative degradation of higher, possibly alkylated, ring systems. Furthermore, they may be obtained from carbon-containing substances, such as graphite and coal, by oxidation with nitric acid or oxygen, for instance. Other aromatic carboxylic acids suitable for the process according to the invention are derived from polycyclic aromatic hydrocarbons, such as $\alpha$- and $\beta$-naphthoic acid, naphthalic acid, diphenic acid, naphthalene-1,4,5-tricarboxylic acid and naphthalene-1,4,5,8-tetracarboxylic acid. Similarly suitable are aromatic heterocyclic carboxylic acids such as pyridine carboxylic acids, but they generally are less desirable as starting materials for economic reasons.

The above-mentioned acids or their mixtures are used for the process according to the invention in the form of their alkali-metal salts. It is preferred to treat the salts of potassium because particularly good results are achieved therewith. The rubidium and cesium salts, which produce equally good yields are less desirable for economic reasons. The sodium and salts may likewise be used.

Suitable catalysts for the process according to the invention are primarily cadmium in metallic form and its compounds; for example, its oxide or its salts formed with inorganic or organic acids, also metal-organic or complex compounds of cadmium. Similarly, a few other metals, especially zinc and mercury, as well as compounds of these metals may be used. The amount of catalyst added to the starting materials may vary within rather wide limits, namely from 0 to about 15% by weight of reactants and preferably from about 0.5 to about 5% by weight of the starting materials. Most advantageously, the catalyst is provided in finely divided state and uniformly distributed throughout the starting materials. This is advantageously accomplished by mixing the dry ingredients intimately such as by ball milling.

For the performance of the process according to the invention, it is necessary to exclude the presence of substantial quantities of oxygen. It is therefore advantageous to operate in the presence of a suitable non-oxydative atmosphere, preferably in the presence of carbon dioxide under pressure. However, other inert gases, for example nitrogen or argon may be used, possibly in admixture with carbon dioxide. These gases are ordinarily employed under superatmospheric pressures.

For the performance of the process according to the invention, it is further necessary to exclude the presence of water. All of the starting materials are therefore preferably used in a carefully dried or anhydrous state. In order to exclude the presence of small amounts of water which may either be present in the starting materials or which may form due to side reactions or decomposition reactions, it is advantageous to add to the reaction mixture water-binding materials which are capable of tying up or reacting with water under the prevailing reaction conditions without interfering with the reaction proper. Such water-binding materials may be of a chemically very different nature. Suitable are, for example, carbides of various earth metals, such as aluminium carbide, or also carbides of alkaline-earth metals or alkali metals, such as calcium carbide. Similarly, other compounds of the above-mentioned metals, such as their nitrides or borides or cyanates, especially potassium cyanate, may be used as well as elemental silicon or boron or various organic compounds with these elements, such as silicon tetraphenyl. These water-binding materials should likewise be added in a finely divided state and be intimately mixed with the other reactants.

In general, the reaction according to the invention begins to occur at a temperature above 300° C. The optimum reaction temperature varies and depends upon the starting material used. The upper temperature limit is determined by the decomposition temperature of the starting materials or the reaction products. The preferred temperatures are between about 350° C. and about 500° C. for most starting materials.

The separation of the reaction mixtures is, as a rule, simple. The unreacted aromatic hydrocarbons free from carboxyl groups or aromatic heterocyclic compounds free from carboxyl groups may be recovered. In the performance of the process on an industrial scale the aromatic compounds may be recycled. The same applies to the inert gas which is employed; for example, the carbon dioxide may be used over again after a suitable purification, if necessary. Similarly, other additives, such as the catalyst, may be used several times. The various carboxylic acids may be separated by conventional methods.

The process according to the invention in many cases yields industrially valuable aromatic or heterocyclic symmetrical dicarboxylic acids or their salts, such as terephthalic acid, naphthalene-2,6-dicarboxylic acid or isocinchomeronic acid. Other aromatic symmetrical polycarboxylic acids, such as trimesic acid are often formed as side products.

The following examples will further illustrate our invention and enable persons skilled in the art to understand the invention more completely. It is understood, however, that the examples are illustrative only and that our invention is not limited to these particular examples.

*Example I*

40.6 gm. of the tetrapotassium salt of pyromellitic acid were intimately admixed with 4.0 gm. of cadmium fluoride and 10.0 gm. of aluminum carbide by milling in a ball mill and the milled mixture was placed with 325 cc. of benzene into an autoclave having a capacity of 600 cc. Subsequently, the contents of the autoclave were heated for 15 hours at 425° C. Prior to heating, a sufficient amount of carbon dioxide was introduced under pressure so that a pressure of 1400 atmospheres developed at the reaction temperature. After cooling and releasing the pressure from the autoclave, the solid reaction products were freed from excess benzene and dissolved in water. The resulting solution was filtered and the filtrate was acidified with hydrochloric acid at 90 to 100° C. The terephthalic acid precipitated thereby was filtered off while the solution was hot, the filter cake was washed with hot water and then dried at 140° C. The yield was 23.35 gm. representing about a 70% yield based on the starting potassium salt. By extraction with ether, 3.8 gm. of pyromellitic acid were recovered from the mother liquor.

*Example II*

40.6 gm. of the tetrapotassium salt of pyromellitic acid, 3.0 gm. of cadmium terephthalate and 5.0 gm. of aluminum carbide were admixed in a ball mill and the milled mixture was heated together with 325 cc. of benzene in an autoclave having a capacity of 600 cc. for 25 hours at 410° C. At the beginning of the run, a sufficient amount of carbon dioxide was introduced into the autoclave under pressure so that a pressure of about 1500 atmospheres resulted at the reaction temperature. The solid reaction products were worked up in the manner described in Example 1. 19.2 gm. of terephthalic acid were obtained. 5.4 gm. of pyromellitic acid were recovered from the mother liquor.

*Example III*

32.4 gm. of the tripotassium salt of hemimellitic acid, 2.0 gm. of cadmium fluoride and 5.0 gm. of aluminum carbide were admixed in a ball mill and the resulting mixture was subsequently heated together with 325 cc. of benzene for 16 hours at 410° C. in an autoclave having a capacity of 600 cc. At the beginning of the run, a sufficient amount of carbon dioxide was introduced into the autoclave under pressure so that a pressure of about 1500 atmospheres resulted at the reaction temperature. The solid reaction products were worked up in the same manner as described in Example 1. 17.05 gm. of terephthalic acid were obtained. 2.6 gm. of tricarboxylic acid were recovered from the mother liquor.

*Example IV*

40.6 gm. of the tetrapotassium salt of pyromellitic acid were admixed in a ball mill with 4.0 gm. of cadmium fluoride and 10.0 gm. of aluminum carbide (grain size < 0.06 mm.) and the resulting mixture, together with 300 cc. of benzene, was heated for 15 hours at 425° C. in an autoclave having a capacity of 600 cc. At the beginning of the run, 150 atmospheres nitrogen were introduced into the autoclave. The final pressure at 425° C. was 720 atmospheres. The solid reaction products were worked up in the manner described above, whereby 4.65 gm. of terephthalic acid were obtained. By crystallization and extraction with ether, a total of 19.2 gm. of pyromellitic acid were recovered from the mother liquor.

*Example V*

40.6 gm. of the tetrapotassium salt of pyromellitic acid were admixed in a ball mill with 4.0 gm. of cadmium fluoride and 11.2 gm. of powdered silicon and the resulting mixture together with 290 cc. of benzene was heated for 15 hours at 425° C. in an autoclave having a capacity of 600 cc. At the beginning of the run, a sufficient amount of carbon dioxide was introduced into the autoclave under pressure so that a pressure of 1500 atmospheres developed at the reaction temperature. The solid reaction products were worked up in the manner described in Example 1. 12.25 gm. of terephthalic acid were obtained. After cooling the mother liquor, a total of 12.65 gm. of pyromellitic acid were recovered by crystallization and extraction with ether.

*Example VI*

A mixture of 40.6 gm. of the tetrapotassium salt of pyromellitic acid, 100 gm. of naphthalene, 10.0 gm. of aluminum carbide and 4.0 gm. of cadmium chloride was heated for 15 hours at 425° C. in an autoclave having a capacity of 600 cc. At the beginning of the run, a sufficient amount of carbon dioxide was introduced into the autoclave under pressure so that a pressure of 1450 atmospheres developed at the reaction temperature. After cooling, the reaction product was comminuted and digested with acetone in order to dissolve excess naphthalene. The undissolved residue was dissolved in hot water and the solution was filtered. The filtrate was acidified with hydrochloric acid while hot. The precipitated naphthalene-2,6-dicarboxylic acid was washed with hot water and with alcohol. The yield was 13.2 gm. By extraction with ether, 13.3 gm. of pyromellitic acid were recovered from the mother liquor.

*Example VII*

A mixture of 40.6 gm. of the tetrapotassium salt of pyromellitic acid, 200 cc. of anhydrous pyridine, 10.0 gm. of aluminum carbide and 2.0 gm. of cadmium fluoride was heated in an autoclave having a capacity of 600 cc. for 16 hours at 410° C. At the beginning of the run, a sufficient amount of carbon dioxide was introduced into the autoclave under pressure so that a pressure of 660 atmospheres developed at the reaction temperature. After cooling, the reaction product was separated from excess pyridine by filtration and was then dissolved in hot water. The solution was filtered and the filtrate was acidified with hydrochloric acid at the boiling point. 8.4 gm. of terephthalic acid precipitated out and were separated. By crystallization and extraction with ether, 11.85 gm. of isocinchomeronic acid as well as 6.95 gm. of unreacted pyromellitic acid were recovered from the mother liquor.

*Example VIII*

A mixture of 48.4 gm. of dipotassium phthalate, 250 cc. of anhydrous pyridine, 10.0 gm. of aluminum carbide and 2.5 gm. of cadmium fluoride was heated in an autoclave having a capacity of 600 cc. for 16 hours at 410° C. At the beginning of the run, a sufficient quantity of carbon dioxide was introduced into the autoclave under pressure so that a pressure of 1300 atmospheres developed at the reaction temperature. After cooling, the reaction product was separated from excess pyridine by filtration and was then dissolved in hot water. The solution was filtered and the filtrate was acidified with hydrochloric acid at the boiling point. 20.8 gm. of terephthalic acid were obtained thereby. After cooling a total of 6.55 gm. of isocinchomeronic acid were recovered from the mother liquor by crystallization and extraction with ether.

*Example IX*

A mixture of 32.0 gm. of potassium benzoate, 250 cc. of pyridine, 10.0 gm. of aluminum carbide (grain size < 0.06 mm.) and 2.0 gm. of cadmium fluoride was heated in an autoclave having a capacity of 600 cc. for 16 hours at 420° C. At the beginning of the run, a sufficient amount of carbon dioxide was introduced into the autoclave under pressure so that a pressure of 1450 atmospheres developed at the reaction temperature. After cooling, the reaction product was dissolved in 1 liter of water and the solution was filtered. The filtrate was evaporated to a volume of 300 cc. and was then again filtered. Subsequently, the filtrate was acidified with hydrochloric acid at the boiling point. The precipitate obtained thereby weighed 4.5 gm. and consisted entirely of terephthalic acid. By crystallization and extraction with ether, 6.0 gm. of isocinchomeronic acid were recovered from the mother liquor.

*Example X*

A mixture of 40.6 gm. of the tetrapotassium salt of pyromellitic acid, 4.0 gm. of cadmium fluoride, 10.0 gm. of amorphous boron and 325 cc. of benzene was heated in an autoclave having a capacity of 600 cc. for 15 hours at 425° C. At the beginning of the run, a sufficient amount of carbon dioxide was introduced into the autoclave under pressure so that a pressure of 1350 atmospheres developed at the reaction temperature. After cooling, the reaction product which weighed 59.4 gm. was worked up in the manner described above. 26.2 gm. of terephthalic acid were obtained thereby. By extraction of the mother liquor with ether, an additional 2.5 gm. of pyromellitic acid were recovered.

*Example XI*

A mixture of 34.2 gm. of the tetrasodium salt of pyromellitic acid, 2.0 gm. of cadmium fluoride, 10.0 gm. of amorphous boron and 250 cc. of dry pyridine was heated in an autoclave having a capacity of 600 cc. for 16 hours at 430° C. At the beginning of the run, a sufficient amount of carbon dioxide was introduced into the autoclave under pressure so that a pressure of 840 atmospheres developed at the reaction temperature. The reaction product, which weighed 46.8 gm., was worked up in the manner described above. 4.5 gm. of terephthalic acid were obtained thereby. Upon cooling, 2.9 gm. of a mixture of pyridine di- and tricarboxylic acids crystallized out of the mother liquor.

*Example XII*

A mixture of 40.6 gm. of the tetrapotassium salt of pyromellitic acid, 4.0 gm. of zinc chloride, 10.0 gm. of silicon and 300 cc. of anhydrous pyridine was heated in an autoclave having a capacity of 600 cc. for 20 hours at 410° C. At the beginning of the run, a sufficient amount of carbon dioxide was introduced into the autoclave under pressure so that a pressure of 1440 atmospheres developed at the reaction temperature. After cooling and releasing the pressure from the autoclave, the excess pyridine was decanted and the solid reaction product, which weighed 57.0 gm. was worked up in the manner described above. 12.7 gm. of terephthalic acid were obtained thereby. By crystallization and extraction with ether, 11.2 gm. of isocinchomeronic acid were recovered from the mother liquor.

The above examples disclose the wide range of reaction conditions, within which the process of the invention occurs. Various mono- and dicyclic aromatic hydrocarbons and aromatic heterocyclic starting materials free from carboxyl groups are shown as operative as well as various benzene carboxylic acids. Various alkali-metal salts of the acids can be employed, and although the potassium salts are preferred, Example XI discloses operability of other alkali-metal salts. While cadmium fluoride is a convenient catalyst to employ, Examples II, VI, and XII, show that other cadmium salts, either inorganic or organic or other metallic catalysts may be employed. As water-binding agent, any of a number of compounds may be employed. Aluminum carbide is excellent, although other agents can be employed with similar results. Examples V, and X to XII disclose use of silicon and boron in powdered form. Example IV discloses the use of other inert atmospheres.

We claim:

1. The process of producing dipotassium terephthalate which comprises heating, under anhydrous conditions, a potassium salt of an unsubstituted benzene carboxylic acid containing at least three carboxyl groups and benzene in the presence of a cadmium catalyst selected from the group consisting of cadmium, zinc and compounds thereof, and aluminum carbide to a temperature between about 350° C. and about 500° C. under a superatmospheric pressure of an inert gas selected from the group consisting of carbon dioxide, nitrogen and argon, separating unreacted benzene from the reaction mass, and separating dipotassium terephthalate from the reaction mass.

2. The process of producing naphthalene-2,6-dicarboxylic acid which comprises heating, under anhydrous conditions, a potassium salt of an unsubstituted benzene carboxylic acid and naphthalene in the presence of a catalyst selected fom the group consisting of cadmium, zinc and compounds thereof, and a water-binding aluminum carbide to a temperature between about 350° C. and about 500° C. under a superatmospheric pressure of an inert gas selected from the group consisting of carbon dioxide, nitrogen and argon, adding water to dissolve the potassium salts of naphthalene-2,6-dicarboxylic acid in aqueous solution, acidifying the solution to precipitate naphthalene-2,6-dicarboxylic acid and recovering said precipitate from the mother liquor.

3. The process of producing alkali-metal salts of terephthalic acid and alkali metal salts of isocinchomeronic acid which comprises heating, under anhydrous conditions, an alkali-metal salt of an unsubstituted benzene carboxylic acid and pyridine in the presence of a catalyst selected from the group consisting of cadmium, zinc, mercury, and compounds thereof and a water-binding agent selected from the group consisting of earth metal carbides, alkaline earth carbides, elemental silicon and elemental boron to a temperature between about 350° C. and about 500° C. under a superatmospheric pressure of an inert gas selected from the group consisting of carbon dioxide, nitrogen and argon recovering a mixture of alkali-metal salts of terephthalic acid and alkali-metal salts of isocinchomeronic acid and separating said alkali metal salts.

4. The method of claim 3 wherein said alkali-metal salt of a benzene carboxylic acid was dipotassium orthophthalate.

5. The method of claim 3 wherein said alkali-metal salt of a benzene carboxylic acid was tetrapotassium pyromellitic acid.

6. The process of producing terephthalic acid and isocinchomeronic acid which comprises heating, under anhydrous conditions, an alkali metal salt of an unsubstituted benzene carboxylic acid and pyridine in the presence of a catalyst selected from the group consisting of cadmium, zinc, mercury, and compounds thereof and a water-binding agent selected from the group consisting of earth metal carbides, alkaline earth carbides, elemental silicon and elemental boron to a temperature between about 350° C. and about 500° C. under a superatmospheric pressure of an inert gas selected from the group consisting of carbon dioxide, nitrogen and argon, recovering a mixture of alkali-metal salts of terephthalic acid and alkali metal salts of isocinchomeronic acid dissolving said mixture of salts in water, acidifying to precipitate terephthalic acid, separating said terephthalic acid from the mother liquor and separating isocinchomeronic acid from said mother liquor free from terephthalic acid.

7. The method of claim 6 wherein said alkali-metal salts of an unsubstituted benzene carboxylic acid was dipotassium orthophthalate.

8. The process of producing alkali-metal salts of symmetrical aromatic polycarboxylic acids selected from the group consisting of di- and tricarboxylic acids, said aromatic carboxylic acids containing aromatic rings free of substituents other than carboxyl groups selected from the group consisting of benzene, dicyclic aromatic hydrocarbon, pyridine, quinoline, isoquinoline, dipyridyl, thiophene and thianaphthene, which comprises heating under anhydrous conditions (1) an alkali metal salt of an aromatic carboxylic acid, said aromatic carboxylic acid containing aromatic rings free of substituents other than carboxy groups selected from the group consisting of benzene, dicyclic aromatic hydrocarbon and pyridine, with (2) an aromatic compound free of substituents selected from the group consisting of dicyclic aromatic hydrocarbon, pyridine, quinoline, isoquinoline, dipyridyl, thiophene and thianaphthene, to a temperature between 300° C. and the decomposition temperature of the starting materials and the reaction products in the presence of (A) a catalyst selected from the group consisting of cadmium, zinc, and compounds thereof, and (B) a water-binding agent capable of tying up water under the prevailing reaction conditions without interfering with the reaction, in a substantially oxygen-free atmosphere of an inert gas under superatmospheric pressure to produce a mixture of said alkali-metal salts of symmetrical aromatic polycarboxylic acids and starting compounds, and separating the starting compounds from the symmetrical acid salts.

9. The process of producing symmetrical aromatic polycarboxylic acids selected from the group consisting of di- and tricarboxylic acids, said aromatic carboxylic acids containing aromatic rings free of substituents other than carboxyl groups selected from the group consisting of benzene, dicyclic aromatic hydrocarbon, pyridine, quinoline, isoquinoline, dipyridyl, thiophene and thianaphthene, which comprises heating, under anhydrous conditions (1) an alkali-metal salt of an aromatic carboxylic acid, said aromatic carboxylic acid containing aromatic rings free of substituents other than carboxyl groups selected from the group consisting of benzene, dicyclic aromatic hydrocarbon and pyridine, with (2) an aromatic compound free of substituents selected from the group consisting of dicyclic aromatic hydrocarbon, pyridine, quinoline, isoquinoline, dipyridyl, thiophene and thianaphthene, to a temperature between 300° C. and the decomposition temperature of the starting materials and the reaction products in the presence of (A) a catalyst selected from the group consisting of cadmium, zinc, and compounds thereof, and (B) a water-binding agent capable of tying up water under the prevailing reaction conditions without interfering with the reaction, in a substantially oxygen-free atmosphere of an inert gas under superatmospheric pressure, to produce a mixture of alkali-metal salts of said symmetrical aromatic polycarboxylic acids, converting the alkali-metal salts of said symmetrical acids into the corresponding free acids and separating said free acids from the reaction mass.

10. The process of claim 8 wherein said water-binding agent is selected from the group consisting of earth metal carbides, alkaline earth carbides, elemental silicon and elemental boron, and said inert gas under superatmospheric pressure is selected from the group consisting of carbon dioxide, nitrogen and argon.

11. The process of claim 9 wherein said water-binding agent is selected from the group consisting of earth metal carbides, alkaline earth carbides, elemental silicon and elemental boron, and said inert gas under superatmospheric pressure is selected from the group consisting of carbon dioxide, nitrogen and argon.

12. The process of producing alkali-metal salts of symmetrical aromatic polycarboxylic acids selected from the group consisting of di- and tricarboxylic acids, said aromatic carboxylic acids containing aromatic rings free of substituents other than carboxyl groups selected from the group consisting of benzene, dicyclic aromatic hydrocarbon and pyridine, which comprises heating under anhydrous conditions (1) an alkali metal salt of an aromatic carboxylic acid, said aromatic carboxylic acid containing aromatic rings free of substituents other than carboxy groups selected from the group consisting of benzene carboxylic acids having at least 3 carboxyl groups, dicyclic aromatic hydrocarbon carboxylic and pyridine carboxylic acid with (2) benzene to a temperature between 300° C. and the decomposition temperature of the starting materials and the reaction products in the presence of (A) a catalyst selected from the group consisting of cadmium, zinc, and compounds thereof, and (B) a water-binding agent capable of tying up water under the prevailing reaction conditions without interfering with the reaction, in a substantially oxygen-free atmosphere of an inert gas under superatmospheric pressure to produce a mixture of said alkali-metal salts of symmetrical aromatic polycarboxylic acids and starting compounds, and separating the starting compounds from the symmetrical acid salts.

13. The process of producing alkali-metal salts of symmetrical benzene polycarboxylic acids and alkali-metal salts of symmetrical aromatic nitrogen-heterocyclic polycarboxylic acids selected from the group consisting of di- and tricarboxylic acids which comprises heating, under anhydrous conditions, (1) an alkali-metal salt of an unsubstituted benzene carboxylic acid and (2) pyridine in the presence of a catalyst selected from the group consisting of cadmium, zinc, mercury, and compounds thereof, and a water-binding agent selected from the group consisting of earth metal carbides, alkaline earth carbides, elemental silicon and elemental boron to a temperature between about 350° C. and about 500° C. under a superatmospheric pressure of an inert gas selected from the group consisting of carbon dioxide, nitrogen and argon, recovering a mixture of alkali-metal salts of symmetrical benzene polycarboxylic acids and alkali-metal salts of symmetrical aromatic nitrogen-heterocyclic polycarboxylic acids, and separating said alkali-metal salts.

14. The process of producing symmetrical benzene polycarboxylic acids and aromatic nitrogen-heterocyclic polycarboxylic acids selected from the group consisting of di- and tricarboxylic acids which comprises heating, under anhydrous conditions, (1) an alkali-metal salt of an unsubstituted benzene carboxylic acid and (2) pyridine in the presence of a catalyst selected from the group consisting of cadmium, zinc, mercury, and compounds thereof, and a water-binding agent selected from the group consisting of earth metal carbides, alkaline earth carbides, elemental silicon and elemental boron to a temperature between about 350° C. and about 500° C. under a superatmospheric pressure of an inert gas selected from the group consisting of carbon dioxide, nitrogen and argon, recovering a mixture of alkali-metal salts of symmetrical benzene polycarboxylic acids and alkali-metal salts of symmetrical aromatic nitrogen-heterocyclic polycarboxylic acids, converting the alkali-metal salts into the corresponding free acids, and separating said symmetrical benzene polycarboxylic acids and said symmetrical aromatic nitrogen-heterocyclic polycarboxylic acids from each other and the reaction mass.

References Cited in the file of this patent

UNITED STATES PATENTS

| | | |
|---|---|---|
| 2,863,914 | Raecke | Dec. 9, 1958 |
| 2,864,860 | Walker et al. | Dec. 16, 1958 |
| 2,891,992 | Raecke et al. | June 23, 1959 |
| 2,948,735 | Blaser et al. | Aug. 9, 1960 |
| 2,948,750 | Blaser et al. | Aug. 9, 1960 |